US008682247B2

(12) United States Patent  
Chavez et al.

(10) Patent No.: US 8,682,247 B2
(45) Date of Patent: *Mar. 25, 2014

(54) PERFORMING CALLER BASED ROUTING OF A PHONE CALL

(75) Inventors: Timothy R. Chavez, Austin, TX (US); Jacob D. Eisinger, Austin, TX (US); Michael C. Hollinger, Austin, TX (US); Jennifer E. King, Austin, TX (US); Christina K. Lauridsen, Austin, TX (US); Fabian F. Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/559,056

(22) Filed: Jul. 26, 2012

(65) Prior Publication Data

US 2013/0023273 A1  Jan. 24, 2013

Related U.S. Application Data

(63) Continuation of application No. 12/115,659, filed on May 6, 2008, now Pat. No. 8,280,415.

(51) Int. Cl.
*H04B 7/00* (2006.01)

(52) U.S. Cl.
USPC ............... 455/41.2; 379/202.01; 370/352; 455/445

(58) Field of Classification Search
USPC .......... 455/461, 417, 465, 426.1, 41.2, 552.1, 455/552.3, 445, 423.2, 67.11
See application file for complete search history.

(56) References Cited

U.S. PATENT DOCUMENTS

| 5,592,533 | A  | 1/1997  | McHenry et al. |
| 5,845,207 | A  | 12/1998 | Amin et al.    |
| 6,363,248 | B1 | 3/2002  | Silverman      |
| 6,404,860 | B1 | 6/2002  | Casellini      |
| 6,408,187 | B1 | 6/2002  | Merriam        |
| 6,421,437 | B1 | 7/2002  | Slutsman       |

(Continued)

FOREIGN PATENT DOCUMENTS

EP   1777916 A1   4/2007

OTHER PUBLICATIONS

U.S. Appl. No. 12/395,910 entitled "Urgent Communications That Overcome Receiving Device Impediments"; Non-final office action dated Jul. 26, 2011.

(Continued)

*Primary Examiner* — George Eng
*Assistant Examiner* — Joseph Dean, Jr.
(74) *Attorney, Agent, or Firm* — Yudell Isidore Ng Russell PLLC

(57) ABSTRACT

A caller telecommunication device transmits a call to an intended receiving wireless telecommunication device. In response, the caller telecommunication device transmits an instruction to a first proximate telecommunication device, wherein the instruction directs the first proximate telecommunication device to determine if the first proximate telecommunication device is within a predefined proximity of the intended receiving wireless telecommunication device. The predefined proximity is a distance within which the intended receiving wireless telecommunication device and other wireless telecommunication device can directly communicate by local signals. The caller communication device re-routes the call to the first proximate telecommunication device if the first proximate telecommunication device is within the predefined proximity of the intended receiving wireless telecommunication device.

15 Claims, 3 Drawing Sheets

(56) References Cited

U.S. PATENT DOCUMENTS

| | | | |
|---|---|---|---|
| 6,438,393 | B1 | 8/2002 | Suuronen |
| 6,741,688 | B1 | 5/2004 | Yau |
| 7,089,041 | B2 | 8/2006 | Huang |
| 7,130,664 | B1 | 10/2006 | Williams |
| 7,225,241 | B2 | 5/2007 | Yada |
| 7,260,205 | B1 | 8/2007 | Murphy et al. |
| 7,319,744 | B1 | 1/2008 | Arnold et al. |
| 7,356,307 | B1 | 4/2008 | Parker |
| 7,953,398 | B2 | 5/2011 | Shim et al. |
| 8,244,282 | B2 | 8/2012 | Chavez et al. |
| 8,280,412 | B2 | 10/2012 | Rudolf |
| 8,285,839 | B2 | 10/2012 | Butterfield et al. |
| 8,345,837 | B2 | 1/2013 | Chavez et al. |
| 8,385,531 | B2 | 2/2013 | Chavez et al. |
| 8,484,344 | B2 | 7/2013 | Butterfield et al. |
| 2002/0073106 | A1 | 6/2002 | Parker et al. |
| 2002/0126679 | A1 | 9/2002 | Morton |
| 2002/0186828 | A1 | 12/2002 | Bushnell |
| 2002/0194331 | A1 | 12/2002 | Lewis et al. |
| 2003/0033394 | A1 | 2/2003 | Stine |
| 2003/0059016 | A1 | 3/2003 | Lieberman |
| 2003/0120805 | A1 | 6/2003 | Couts et al. |
| 2003/0138085 | A1 | 7/2003 | Forman et al. |
| 2004/0022237 | A1 | 2/2004 | Elliott |
| 2004/0202300 | A1* | 10/2004 | Cooper et al. ............ 379/201.01 |
| 2005/0286705 | A1 | 12/2005 | Contolini et al. |
| 2006/0009155 | A1 | 1/2006 | Paalasmaa et al. |
| 2006/0015489 | A1 | 1/2006 | Probst et al. |
| 2006/0047810 | A1 | 3/2006 | Herzog et al. |
| 2006/0077795 | A1 | 4/2006 | Kitahara et al. |
| 2006/0077956 | A1 | 4/2006 | Saksena et al. |
| 2006/0077957 | A1 | 4/2006 | Reddy et al. |
| 2006/0093118 | A1 | 5/2006 | Agrawal et al. |
| 2006/0135138 | A1 | 6/2006 | Lazaridis |
| 2006/0159067 | A1 | 7/2006 | Chen et al. |
| 2006/0165060 | A1 | 7/2006 | Dua |
| 2006/0202819 | A1 | 9/2006 | Adamczyk et al. |
| 2006/0227957 | A1 | 10/2006 | Dolan et al. |
| 2007/0032225 | A1 | 2/2007 | Konicek et al. |
| 2007/0037605 | A1 | 2/2007 | Logan |
| 2007/0044154 | A1 | 2/2007 | Tsujimoto |
| 2007/0232277 | A1 | 10/2007 | Spalink |
| 2007/0287438 | A1 | 12/2007 | Hansen et al. |
| 2008/0004009 | A1 | 1/2008 | Caldwell et al. |
| 2008/0085682 | A1 | 4/2008 | Rao |
| 2008/0112554 | A1 | 5/2008 | Arnold et al. |
| 2008/0130554 | A1 | 6/2008 | Gisby et al. |
| 2008/0165948 | A1 | 7/2008 | Ryals et al. |
| 2009/0023427 | A1 | 1/2009 | Kahn et al. |
| 2009/0086947 | A1 | 4/2009 | Vendrow |
| 2009/0279677 | A1 | 11/2009 | Chavez et al. |
| 2009/0279680 | A1 | 11/2009 | Chavez et al. |
| 2009/0280718 | A1 | 11/2009 | Willett et al. |
| 2009/0280785 | A1 | 11/2009 | Chavez et al. |
| 2009/0280787 | A1 | 11/2009 | Chavez et al. |
| 2009/0280817 | A1 | 11/2009 | Chavez et al. |
| 2009/0280818 | A1 | 11/2009 | Chavez et al. |
| 2010/0009665 | A1 | 1/2010 | Hawkins et al. |
| 2010/0022230 | A1 | 1/2010 | Shim et al. |
| 2011/0021150 | A1* | 1/2011 | Lin ............................... 455/41.2 |
| 2013/0012175 | A1 | 1/2013 | Butterfield et al. |

OTHER PUBLICATIONS

U.S. Appl. No. 12/395,910 entitled "Urgent Communications That Overcome Receiving Device Impediments"; Notice of Allowance dated Jun. 1, 2012.

U.S. Appl. No. 12/115,649 entitled "Performing Proximity Based Routing of a Phone Call"; Non-final office action dated Oct. 28, 2013 (19 pg).

U.S. Appl. No. 12/115,659 entitled "Performing Caller Based Routing of a Phone Call"; Non-final office action dated Aug. 9, 2011 (10 pg).

U.S. Appl. No. 12/115,659 entitled "Performing Caller Based Routing of a Phone Call"; Final office action dated Mar. 2, 2012 (21 pg).

U.S. Appl. No. 12/115,659 entitled "Performing Caller Based Routing of a Phone Call"; Notice of Allowance dated May 21, 2012 (11 pg).

U.S. Appl. No. 12/115,649 entitled "Performing Caller Based Routing of a Phone Call"; Non-final office action dated Aug. 9, 2011 (11 pg).

U.S. Appl. No. 12/395,910 entitled "Urgent Communications that Overcome Receiving Device Impediments"; Notice of Allowance dated Jun. 1, 2012 (18 pg).

U.S. Appl. No. 12/395,910 entitled "Urgent Communications that Overcome Receiving Device Impedimentsl"; Non-final office action dated Jul. 26, 2011 (70 pg).

U.S. Appl. No. 12/115,663 entitled "Performing Routing of a Phone Call Through a Thrid Party Device"; Non-final office action dated Aug. 4, 2011 (14 pg).

U.S. Appl. No. 12/115,654 entitled "Performing Receipient Based ROuting of a Phone Call"; Non-final office action dated Jun. 28, 2011 (16 pg).

U.S. Appl. No. 13/617,631 entitled "Communicating Messages To Proximate Devices on a Contact List Responsive To an Unsuccessful Call"; Non-final office action dated Jan. 2, 2013 (17 pg).

U.S. Appl. No. 13/617,631 entitled "Communicating Messages To Proximate Devices Oncontact List Responsive To an Unsuccessful Call"; Notice of Allowance dated Mar. 4, 2013 (12 pg).

U.S. Appl. No. 12/115,663 entitled "Performing Routing of a Phone Call Through a Third Party Device"; Final office action dated Mar. 2, 2012 (18 pg).

U.S. Appl. No. 12/115,663 entitled "Performing Routing of a Phone Call Through a Third Party Device"; Non-final office action dated Jul. 6, 2012 (15 pg).

U.S. Appl. No. 12/115,663 entitled "Performing Routing of a Phone Call Through a Third Party Device"; Final office action dated Jan. 15, 2013 (20 pg).

U.S. Appl. No. 12/115,663 entitled "Performing Routing of a Phone Call Through a Third Party Device"; Notice of Allowance dated Jun. 24, 2013 (10 pg).

U.S. Appl. No. 12/115,649 entitled "Performing Proximity Based Routing of a Phone Call"; Non-final office action dated Oct. 19, 2012 (11 pg).

U.S. Appl. No. 12/115,673 entitled "Performing Routing of a Phone Call Based on Mutual Contacts of a Contact List" Notice of Allowance dated Oct. 19, 2012 (5 pg).

U.S. Appl. No. 12/115,649 entitled "Performing Proximity Based Routing of a Phone Call"; Final office action dated Jun. 11, 2013 (17 pg).

U.S. Appl. No. 12/115,673 entitled "Performing Routing of a Phone Call Based on Mutual Contacts of a Contact List" Final office action dated Mar. 26, 2012 (17 pg).

U.S. Appl. No. 12/115,673 entitled "Performing Routing of a Phone Call Based on Mutual Contacts of a Contact List" Non-Final office action dated Oct. 24, 2011 (15 pg).

U.S. Appl. No. 12/115,649 entitled "Performing Proximity Based Routing of a Phone Call"; Final office action dated Feb. 21, 2012 (14 pg).

U.S. Appl. No. 12/115,654 entitled "Performing Recipient Based Routing of a Phone Call"; Notice of Allowance Apr. 6, 2012 (10 pg).

U.S. Appl. No. 12/115,654 entitled "Performing Recipient Based Routing of a Phone Call"; Final office action dated Jan. 12, 2012 (17 pg).

U.S. Appl. No. 12/115,684 entitled "Performing Recipient Based Routing of a Phone Call"; Non-final office action dated Mar. 29, 2012 ( pg).

U.S. Appl. No. 12/115684 entitled "Performing Recipient Based Routing of a Phone Call"; Notice of Allowance dated Aug. 20, 2012 (13 pg).

* cited by examiner

PERFORMING CALLER BASED ROUTING OF A PHONE CALL

CROSS-REFERENCE TO RELATED APPLICATION

The present application claims priority under 35 U.S.C. §120 as a continuation application to application Ser. No. 12/115,659, entitled "Method and System for Performing Caller Based Routing of a Phone Call," filed on May 6, 2008 now U.S. Pat. No. 8,280,415, which is hereby incorporated by reference in its entirety.

BACKGROUND OF THE INVENTION

1. Technical Field

The present invention relates in general to telecommunications, and in particular to cellular phones. Still more particularly, the present invention relates to performing caller based routing of a phone call based on preferences of the caller telecommunication device.

2. Description of the Related Art

Cellular (cell) phones have become a ubiquitous aid in allowing a person to be constantly accessible. However, there are times when a person may not desire, or may be unable, to take an incoming call.

SUMMARY OF THE INVENTION

A method, system, and computer program for routing an outgoing voice call in real time is presented. A call is received from a caller to an intended receiving wireless telecommunication device. In response to the call failing to connect to the intended receiving wireless telecommunication device, a caller initiated short range wireless query signal is transmitted to determine if an other wireless communication device is within a predefined proximity to the intended receiving wireless telecommunication device. If the intended receiving wireless telecommunication device receives a response from an other proximate telecommunication device indicating that the proximate telecommunication device is within the predefined proximity to the intended receiving wireless telecommunication device, then the call is rerouted to the proximate telecommunication device based on preferences internal to the caller telecommunication device. These preferences may be stored on the caller telecommunication device or remotely stored on the host carrier network.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
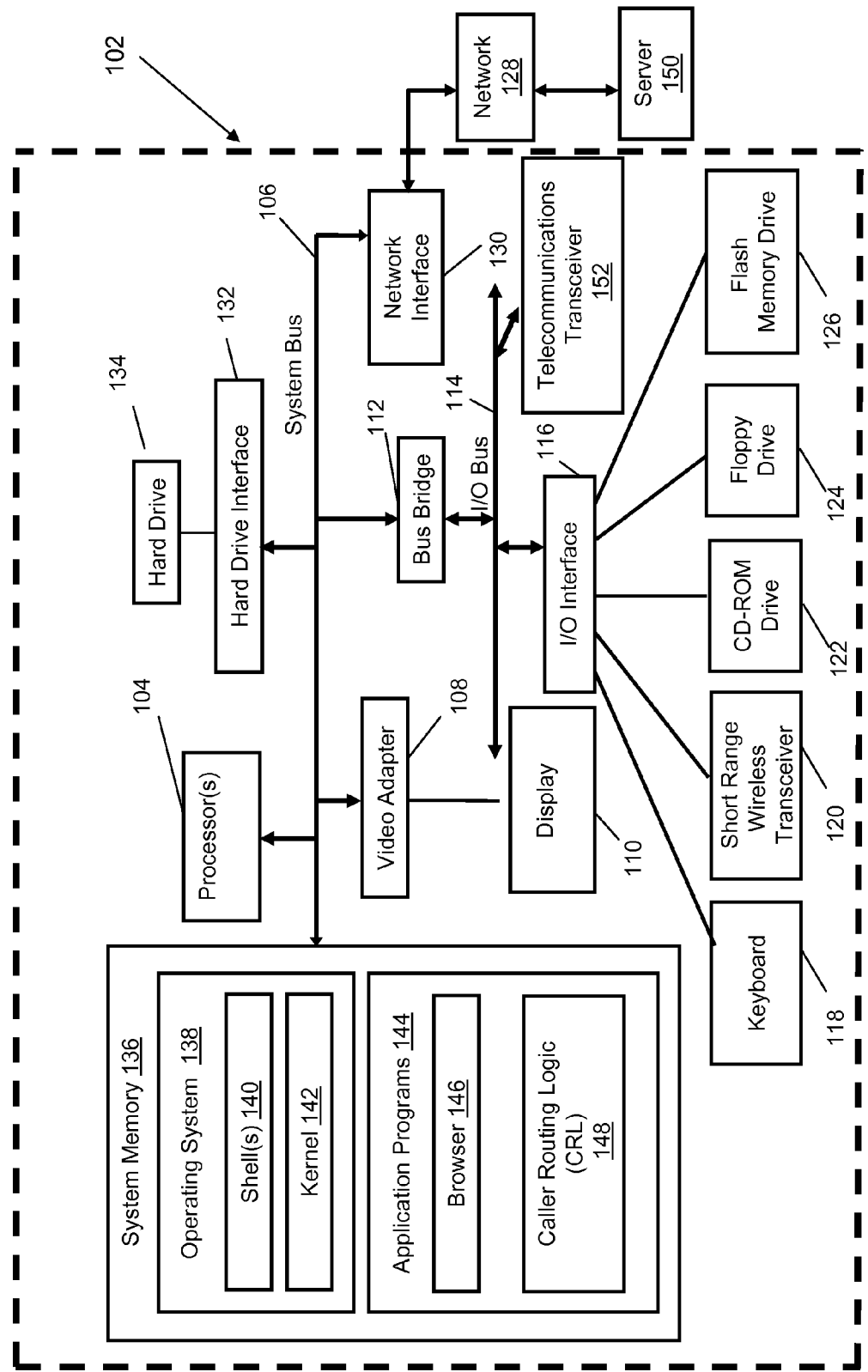
FIG. 1 is a block diagram of a data processing system in which the present invention may be implemented.

With reference now to FIG. 1, there is depicted a block diagram of an exemplary computer 102 in which the present invention may be implemented. Computer 102 includes one or more processors 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a Short Range Wireless Transceiver 120, a Compact Disk-Read Only Memory (CD-ROM) drive 122, a floppy disk drive 124, and a flash drive memory 126. Keyboard 118 may be a standard keyboard (e.g., QWERTY style or similar), or a condensed alphanumeric keypad. The format of the ports connected to I/O interface 116 may be any known to those skilled in the art of computer architecture, including but not limited to Universal Serial Bus (USB) ports. Short Range Wireless Transceiver 120 utilizes short range wireless electromagnetic signals (e.g. wireless spread spectrum, radio frequency (RF), inferred (IR), etc) to allow Computer 102 to transmit or receive voice or data with another telecommunication device.

Computer 102 is able to communicate with a software deploying server 150 via a network 128 using a network interface 130, which is coupled to system bus 106. Network interface 130 may utilize a wired, or a wireless technology such as a cellular broadcast to connect with Network 128. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (e.g., computer 102) to send and receive network messages to the Internet using Hyper-Text Transfer Protocol (HTTP) messaging, thus enabling communication with software deploying server 150.

Application programs 144 in computer 102's system memory (as well as software deploying server 150's system memory) also include a Caller Routing Logic (CRL) 148. CRL 148 includes code for implementing the processes described in FIGS. 2-3. In one embodiment, computer 102 is able to download CRL 148 from software deploying server 150, including in an "on demand" basis, as described in greater detail below in FIGS. 2-3.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 150 performs all of the functions associated with the present invention (including execution of CRL 148), thus freeing computer 102 from having to use its own internal computing resources to execute CRL 148.

Note also the architecture shown in FIG. 1 for computer 102 may be substantially implemented in Caller Telecommunication Device (CTD) 202, Common Host Carrier 204, Intended Receiving Wireless Telecommunication Device (IRWTD) 206, and Proximate Telecommunication Devices (PTDs) 208a-n shown below in FIG. 2. That is, although CTD 202, IRWTD 206 and PTDs 208a-n are described as cellular phones, by including a telecommunications transceiver 152 in the architecture of computer 102, the appropriate elements illustrated as components of computer 102 can operate as a "smart" phone that communicates with a wireless host carrier (e.g., host carrier 204 shown below in FIG. 2), or a Plain Old Telephone System (POTS) system. Additionally, by including a Short Range Wireless Transceiver 120 in the architecture of computer 102, the appropriate elements illustrated as components of computer 102 can operate as an "ad-hoc" network device that communicates with another telecommunication device within a wireless short range proximity to computer 102 (e.g., Proximate Telecommunication Devices (PTDs) 208a-n shown below in FIG. 2).

Figure 2:
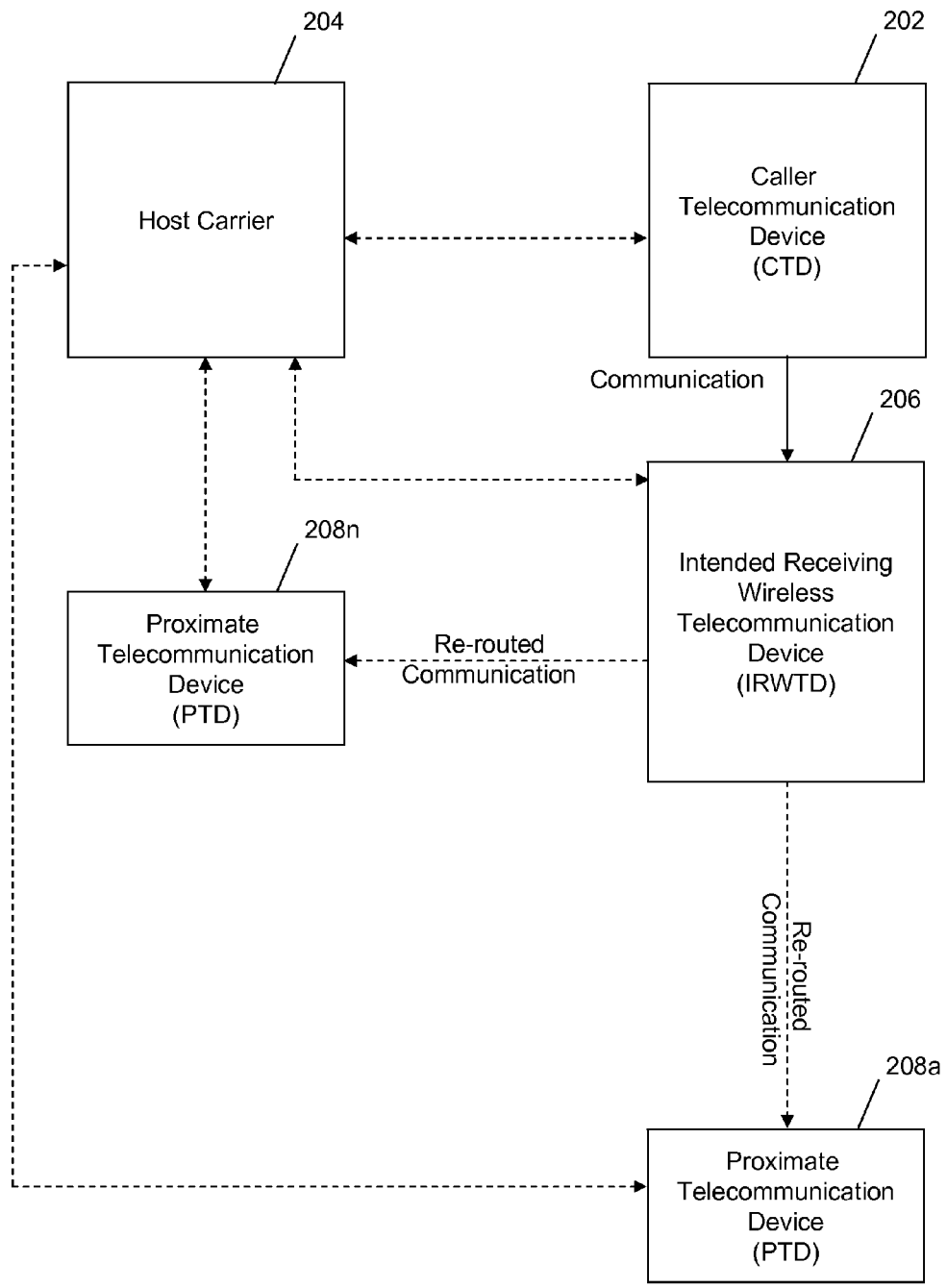
FIG. 2. is a block diagram of an exemplary system for performing caller based routing of a phone call.

With reference now to FIG. 2, a block diagram of the routing system used in an exemplary embodiment of the present invention is presented. A Caller Telecommunication Device (CTD) 202 (e.g., a cell phone, a Plain Old Telephone System (POTS) land line, a cell-capable Personal Digital Assistant (PDA), etc.) connected to Host Carrier 204 initiates a voice call to an Intended Receiving Wireless Telecommunication Device (IRWTD) 206. Host Carrier 204 is a remote service host such as a cellular service provider that is remotely connected to both CTD 202 and IRWTD 206. If IRWTD's 206 ringer is "on", and thus the called user is available, the voice call will be connected. As described below, however, in the present invention, several options are available when IRWTD 206 is otherwise unavailable for routing the voice call if IRWTD 206 has a configured routing profile stored locally on the device, or alternatively stored on Host Carrier 204.

When the user of IRWTD 206 is unavailable, a first routing option is for the caller who is using CTD 202 to leave a voicemail message, which will be retrievable when IRWTD 206 is either turned back on or the user becomes available. However, if the user of CTD 202 desires, the communication may be re-routed from IRWTD 206 to one or more Proximate Telecommunication Devices (PTDs) 208a-n based on user input. When CTD 202 initiates a call with IRWTD 206 and IRWTD 206 is unavailable, software internal to CTD 202 may initiate an instruction for a PTD 208 selected by CTD 202 to scan for IRWTD 206 within physically proximate short range when PTD 208 is configured for proximate device routing. This is accomplished using software internal to PTD 208 (e.g., CRL 148) that autonomously utilizes a hardware based wireless technology internal to PTDs 208a-n, such as a short-range radio or infrared signal, to determine if IRWTD 206 is within a physically proximate short range of PTD 208, and is available to receive the incoming voice call (e.g., Short Range Wireless Transceiver 120). Optionally, an unlicensed secure wireless personal area network (PAN), may be implemented for wireless transmission. The short range of the device is the maximum range of communication available between the selected PTD 208 and IRWTD 206 without the use of a network carrier service (e.g., a cell phone carrier service), and is further determined by the internal wireless technology common to IRWTD 206 and the selected PTD 208. The user of CTD 202 may re-route communication intended for IRWTD 206 to a PTD 208a-n based on user selection, specialized routing lists, or automatically based on successes and failures of past communication routing attempts.

Automatic routing of a communication utilizes statistical data stored on the CTD 202 device of past successes and failures of communication re-routing attempts from the CTD 202 device to an alternate communication device, to determine a desired PTD 208a-n recipient. When automatic re-routing is performed CTD will initiate a short range proximate scan of PTDs 208a-n for the presence of IRWTD 206. Utilizing the data returned from PTDs 208a-n of all PTDs 208a-n within physical short range proximity of IRWTD 206, CTD 202 will autonomously select the first available PTD 208a-n with the highest success rate of communication routing based on past re-routing attempts. The communication is then re-routed from IRWTD 206 to the desired PTD 208a-n

Alternatively, when automatic routing of a communication should fail to route the communication, is not desired by the user, or is unavailable due to the absence of past routing data, the user of CTD 202 may manually select a desired PTD 208a-n within short range proximity of IRWTD 206 as the recipient of the communication. Upon the caller initializing the manual re-routing of the outgoing communication, CTD transmits an instruction to PTDs 208a-n to scan for the presence of IRWTD 206 within short range proximity. PTDs 208a-n within short range proximity then respond back to CTD 202 and the responses are presented on the user interface of CTD 202. The user of CTD 202 can then choose to select a PTD 208 from the list returned or to leave a voicemail message, which will be retrievable when the user of IRWTD 206 becomes available. While the user of CTD 202 is determining a desired PTD 208 as the recipient of the re-routed communication, the user interface of CTD 202 may also display information of the PTDs 208a-n within short range of IRWTD 206 such as statistical information of past successes and failures of routing to a specific PTD 208, or current operational conditions of a PTD 208 (e.g., strong battery, strong signal strength with the IRWTD 206, authorized to take the call from "Caller A," etc.)

When it is desired to route the outgoing communication based on a smart routing list the user of CTD 202 may select a specific routing smart list on the user interface of CTD 202. Upon the caller initializing the manual routing of the outgoing communication, CTD transmits an instruction to PTDs 208a-n to scan for the presence of IRWTD 206 within short range proximity. PTDs 208a-n within short range proximity then respond to CTD 202 providing information regarding proximity to IRWTD 206 along with operation conditions of the PTD 208 (e.g., strong battery, strong signal strength with the IRWTD 206, authorized to take the call from "Caller A," etc). From this information software internal to CTD 202 (e.g., CRL 148), may re-route the outgoing communication to the first available PTD 208a-n in short range proximity of IRWTD 206 based on the smart routing list selected by the user. Smart routing list options may include such options as "Route to first PTD identified as a family member", "Route to first PTD with highest battery life remaining", etc.

The smart routing lists also allow for the communication to be re-routed to the first PTD to answer the outgoing communication. In this option CTD 202 simultaneously initiates routing with all PTDs 208a-n or to a specific group of PTDs 208a-n as selected by the user of CTD 202, within short range proximity of IRWTD 206. In this event, when a first PTD 208a answers the re-routed communication the communication request is autonomously terminated with all other PTDs 208b-n.

The user of CTD 202 may also initiate routing to a PTD 208a-n that is a subscriber of the same Host Carrier 204. Upon initiating the scan for a PTD 208 within short range proximity of IRWTD 206, the user interface of CTD 202 may display an indicator illustrating which available PTDs 208a-n are subscribers to the same Host Carrier 204 as CTD 202. Upon the user selecting a desired PTD 208a-n as the recipient of the communication, software internal to CTD 202 (e.g., CRL 148), may re-route the outgoing communication to the desired PTD 208a-n in short range proximity of IRWTD 206, based on the desired PTDs 208a-n being a subscriber to the same Host Carrier 204 as CTD 202. Additionally, the recipient may be autonomously selected by software internal to CTD 202 (e.g., CRL 148).

Note further that, following every routing attempt by CTD 202, the statistical data of successful and unsuccessful routing attempts is updated on CTD 202.

Figure 3:
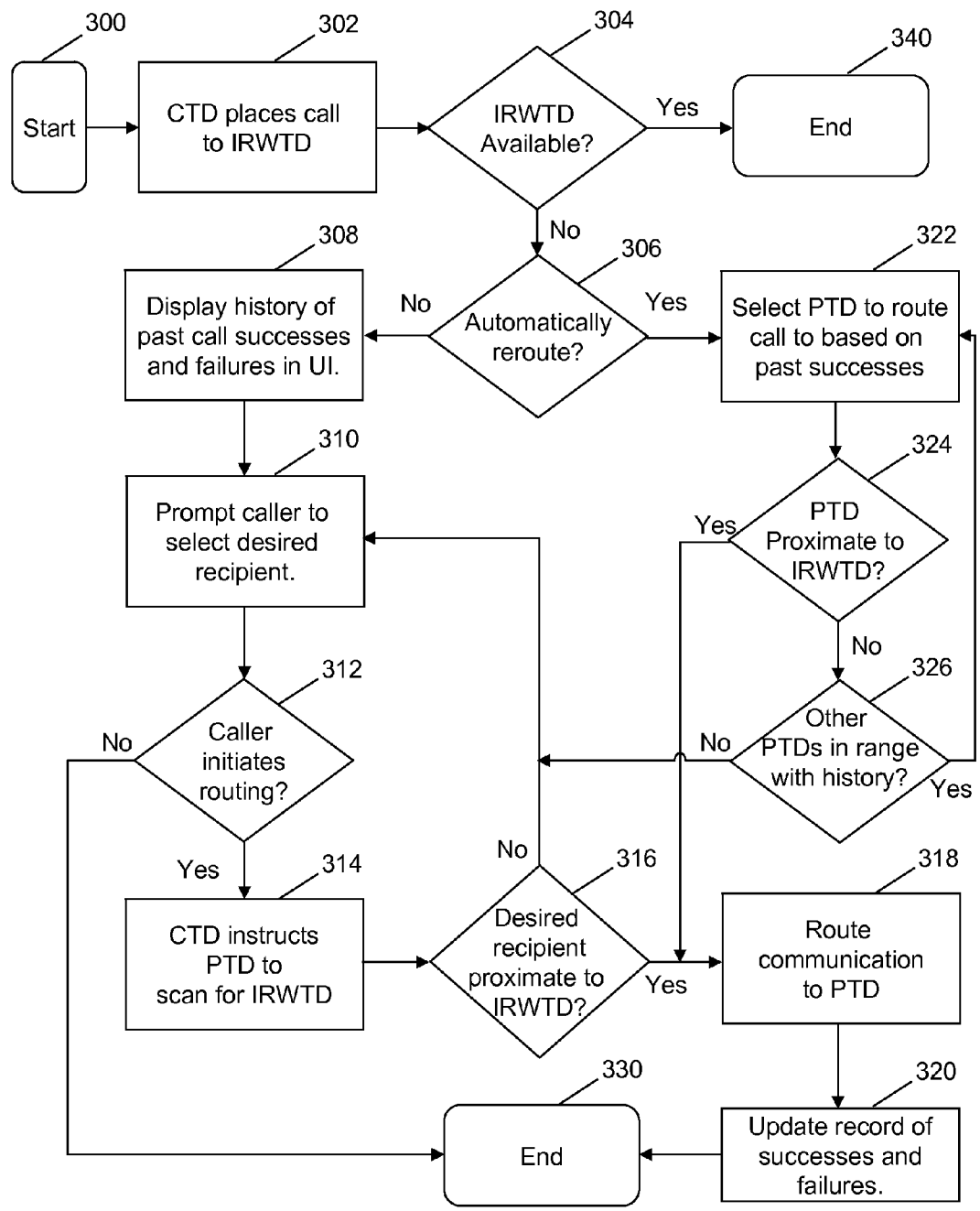
FIG. 3. is a high-level logical flowchart of an exemplary set of steps performed while performing caller based re-routing of an outgoing communication.

With reference now to FIG. 3, a high-level logical flow-chart of an exemplary set of steps performed to route a phone call based on caller input is presented. After initiator block 300, a communication is initiated from a Caller Telecommunication Device (CTD) to an Intended Receiving Wireless Telecommunication Device (IRWTD) (block 302). It is then determined by the Host Carrier if the IRWTD is available (block 304). If IRWTD is available, the call is completed and the process ends at terminator block 340. When IRWTD is not available, the CTD prompts the caller to decide if automatic or manual re-routing of the communication is desired and appropriate (block 306).

When manual routing of an outgoing communication is desired, based on user input to the user interface of CTD, the CTD will display potential contacts to receive the outgoing communication along with historical data of past communication re-routing success rates for these contacts (block 308). The user can then use this information to decide whether or not to proceed with routing the outgoing communication by selecting a desired recipient (block 310). In query block 312 a caller initiates the re-routing by selecting the desired contact or smart routing list as recipient of the outgoing communication, or chooses not to re-route the outgoing communication because of no user input within a specified amount of time, or based on user preference not to route the communication. If the user of CTD does not initiate the re-routing command the process ends at terminator block 330. When the user of CTD initiates a re-routing command by selecting a desired recipient device from the contact list, CTD transmits an instruction to the PTD to scan for the presence of IRWTD within the short range proximity (block 314). Software internal to the PTD then determines if the desired PTD is within short range proximity of IRWTD (block 316). When IRWTD determines the desired recipient is not within short range proximity, then the process loops back to query block 310 in an iterative manner to prompt the user of CTD to select an alternate recipient device. If the desired recipient is a PTD within short range proximity of IRWTD, the communication is re-routed to the PTD (block 318). The software of CTD then autonomously updates the record of successes and failures (block 320), and the process terminates at block 330.

When automatic re-routing of an outgoing communication is automatically attempted or selected, based on user input to the user interface of CTD, CTD autonomously selects a PTD based on historical data of past communication routing success and failures and transmits an instruction to the PTD to scan for the presence of IRWTD within the short range proximity (block 322). Software internal to the PTD then determines if the desired PTD is within short range proximity of IRWTD (block 324). If the desired recipient device is within short range proximity the communication is re-routed to the PTD (block 318). The software of CTD then autonomously updates the record of successes and failures (block 320), and the process terminates at block 330. When the desired PTD is not within short range proximity of IRWTD and there are PTDs within short range proximity of IRWTD, then the process loops back to block 322 in an iterative manner where the software of CTD autonomously selects an alternate recipient device within short range proximity based on historical data of past communication routing success and failures (block 326). If the first attempt at automatically routing the outgoing communication fails and no PTDs are in range of IRWTD with past re-routing historical data, the process loops to block 310 and prompts the caller to manually select a desired recipient and initiate re-routing of the outgoing communication.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of data storage media, which include, without limitation, non-writable storage media (e.g. CD-ROM), and writable storage media (e.g. network attached storages, hard disk drive, read/write CD-ROM, optical media). It should be understood, therefore, that such data storage media, when storing computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to preferred embodiments thereof, it will be apparent that modifications and variations are possible without departing from the scope of the invention defined in the appended claims.

What is claimed is:

1. A method of routing a communication, the method comprising:
 a caller device transmitting a communication to an intended receiving device; and
 in response to the caller device receiving a notification that the receiving device is unavailable, the caller device transmitting an instruction to a first device, wherein the instruction directs the first device to determine when the first device is within a predefined proximity of the receiving device, wherein the predefined proximity is a distance within which the receiving device and the first device can directly communicate by short range wireless signals;
 the caller device re-routing the communication to the first device when if the first device is within the predefined proximity of the receiving device and the receiving device is unavailable; and
 the caller device re-routing the communication to a second device that is within the predefined proximity of the receiving device when the first device is outside the predefined proximity of the receiving device and the receiving device is unavailable.

2. The method of claim 1, further comprising:
 the caller device simultaneously re-routing the communication to the first device and the second device.

3. The method of claim 1, wherein the first device is pre-selected according to a caller-defined criteria established by the caller, wherein the caller-defined criteria is based on the first device being in a same wireless service network as the receiving device.

4. The method of claim 1, wherein the first device is pre-selected according to a caller-defined smart list on the first device, wherein the caller-defined smart list is a plurality of preferences of routing an outgoing communication pre-established by the caller.

5. The method of claim 1, wherein the first device and the second device are pre-selected by the caller according to historical rankings of past successes and failures in re-routing the communication to the first device and the second device.

6. A caller device comprising:
 a processor;
 a data bus coupled to the processor;
 a computer memory coupled to the data bus;
 a computer-readable storage device;
 program instructions, stored on the storage device for execution by the processor via the computer memory, to initiate transmission of a communication from a caller, who is using the caller device, to an intended receiving device; and
 program instructions, stored on the storage device for execution by the processor via the computer memory, to, when the receiving device is unavailable, transmit an instruction from the caller device to a first device, wherein the instruction directs the first device to:
  determine when the first device is within a predefined proximity of the receiving device, wherein the predefined proximity is a distance within which the receiving device and the first device can directly communicate by short range wireless signals;
 program instructions, stored on the storage device for execution by the processor via the computer memory, to, when the first device is within the predefined proximity of the receiving device, re-route the communication from the caller device to the first device; and
 program instructions, stored on the storage device for execution by the processor via the computer memory, to, when the first device is outside the predefined proximity of the receiving device, re-route the communication from the caller device to a second device that is within the predefined proximity of the receiving device.

7. The caller device of claim 6, wherein the first device and the second device are pre-selected by the caller according to historical rankings of past successes and failures in re-routing the communication to the first device and the second device.

8. The caller device of claim 6, wherein the first device is pre-selected according to a caller-defined criteria established by the caller, wherein the caller-defined criteria is based on the first device being in a same wireless service network as the receiving device.

9. The caller device of claim 6, wherein the first device is pre-selected according to a caller-defined smart list on the first device, wherein the caller-defined smart list is a plurality of preferences of routing an outgoing communication pre-established by the caller.

10. The caller device of claim 9, wherein the caller-defined smart list is stored on the caller telecommunication device.

11. A computer program product, comprising:
 a computer-readable storage device;
 program instructions, stored on the storage device, to transmit a communication from a caller who is using a caller device to an intended receiving device; and
 program instructions, stored on the storage device, to in response to receiving a notification that the receiving device is unavailable, transmit an instruction from the caller device to a first device, wherein the instruction directs the first device to determine when the first device is within a predefined proximity of the receiving device, wherein the predefined proximity is a distance within which the receiving device and the first device can directly communicate by short range wireless signals;
 program instructions, stored on the storage device, to re-route the communication to the first device when the first device and the receiving device are within the predefined proximity; and
 program instructions, stored on the storage device, to re-route the communication to a second device when the second device and the receiving device are within the predefined proximity and the first device and the receiving device are not within the predetermined proximity.

12. The computer program product of claim 11, wherein the first device and the second device are pre-selected by the caller according to historical rankings of past successes and failures in re-routing the communication to the first device and the second device.

13. The computer program product of claim 11, wherein the first device is pre-selected according to a caller-defined criteria established by the caller, wherein the caller-defined criteria is based on the first device being in a same wireless service network as the receiving device.

14. The computer program product of claim 11, wherein the first device is pre-selected according to a caller-defined smart list on the first device, wherein the caller-defined smart list is a plurality of preferences of routing an outgoing communication pre-established by the caller.

15. The computer program product of claim 14, wherein the caller-defined smart list is stored on the caller device.

* * * * *